United States Patent
Wolfer et al.

(10) Patent No.: US 11,199,103 B2
(45) Date of Patent: Dec. 14, 2021

(54) SEAL ASSEMBLY FOR A TURBOMACHINE

(71) Applicant: General Electric Company, Schenectady, NY (US)

(72) Inventors: Scott Francis Wolfer, Cincinnati, OH (US); Kevin Richard Crain, Wakefield, MA (US); Jonathan K. Remer, Saugus, MA (US); Robert Burton Brown, Medford, MA (US); Nicholas Rowe Dinsmore, Marblehead, MA (US)

(73) Assignee: General Electric Company, Schenectady, NY (US)

( * ) Notice: Subject to any disclaimer, the term of this patent is extended or adjusted under 35 U.S.C. 154(b) by 50 days.

(21) Appl. No.: 16/123,572

(22) Filed: Sep. 6, 2018

(65) Prior Publication Data

US 2020/0080436 A1    Mar. 12, 2020

(51) Int. Cl.
| | |
|---|---|
| *F01D 11/04* | (2006.01) |
| *F01D 25/12* | (2006.01) |
| *F01D 25/18* | (2006.01) |

(52) U.S. Cl.
CPC ............ *F01D 11/04* (2013.01); *F01D 25/125* (2013.01); *F01D 25/183* (2013.01); *F05D 2220/323* (2013.01); *F05D 2240/52* (2013.01); *F05D 2240/54* (2013.01); *F05D 2240/56* (2013.01);
(Continued)

(58) Field of Classification Search
CPC ...... F01D 11/04; F01D 25/125; F01D 25/183; F05D 2220/323; F05D 2240/52; F05D 2240/54; F05D 2240/56; F05D 2260/20; F05D 2260/98
See application file for complete search history.

(56) References Cited

U.S. PATENT DOCUMENTS

| | | |
|---|---|---|
| 3,085,808 A | 4/1963 | Williams |
| 3,606,349 A | 9/1971 | Petrie et al. |
| 3,743,303 A | 7/1973 | Pope |
| | (Continued) | |

FOREIGN PATENT DOCUMENTS

| | | |
|---|---|---|
| CN | 1427140 A | 7/2003 |
| CN | 104653294 A | 5/2015 |
| | (Continued) | |

OTHER PUBLICATIONS

U.S. Appl. No. 15/865,359, filed Jan. 9, 2018.

*Primary Examiner* — Richard A Edgar
(74) *Attorney, Agent, or Firm* — Klarquist Sparkman, LLP

(57) ABSTRACT

A seal assembly for a turbomachine. The turbomachine includes a rotating shaft extending along a centerline and a fixed housing positioned exterior to the rotating shaft in a radial direction relative to the centerline. The seal assembly includes a sump housing at least partially defining a bearing compartment for holding a cooling lubricant. The seal assembly further includes a bearing supporting the rotating shaft. In addition, the seal assembly also includes a sump seal at least partially defining the bearing compartment. A pressurized housing of the seal assembly is positioned exterior to the sump housing and defines a pressurized compartment to at least partially enclose the sump housing. Further, a non-contacting carbon seal is positioned between the rotating shaft and the fixed housing to at least partially define the pressurized compartment to enclose the sump housing.

20 Claims, 7 Drawing Sheets

(52) U.S. Cl.
CPC ...... *F05D 2260/20* (2013.01); *F05D 2260/98* (2013.01)

(56) References Cited

U.S. PATENT DOCUMENTS

| | | | |
|---|---|---|---|
| 4,082,296 A | 4/1978 | Stein | |
| 4,406,466 A | 9/1983 | Geary, Jr. | |
| 4,407,512 A | 10/1983 | Trytek | |
| 4,542,623 A | 9/1985 | Hovan et al. | |
| 4,738,453 A | 4/1988 | Ide | |
| 4,916,892 A | 4/1990 | Pope | |
| 5,174,584 A | 12/1992 | Lahrman | |
| 5,403,019 A | 4/1995 | Marshall | |
| 5,558,341 A * | 9/1996 | McNickle | F16J 15/3488 277/400 |
| 5,619,850 A * | 4/1997 | Palmer | F01D 11/04 60/39.83 |
| 6,142,729 A | 11/2000 | Tran et al. | |
| 6,145,843 A | 11/2000 | Hwang | |
| 6,505,834 B1 | 1/2003 | Dinc et al. | |
| 6,679,045 B2 | 1/2004 | Karafillis et al. | |
| 7,093,418 B2 * | 8/2006 | Morris | F01D 25/125 184/6.11 |
| 7,175,388 B2 | 2/2007 | Labbe et al. | |
| 7,320,468 B2 | 1/2008 | Morgan | |
| 7,770,895 B2 | 8/2010 | Zheng et al. | |
| 8,092,093 B2 * | 1/2012 | Fang | F01D 25/183 277/423 |
| 8,162,322 B2 | 4/2012 | Flaherty | |
| 8,206,083 B2 | 6/2012 | Garrison | |
| 9,039,013 B2 | 5/2015 | Artiles et al. | |
| 9,279,341 B2 | 3/2016 | Durocher et al. | |
| 9,638,326 B2 * | 5/2017 | Haynes | F16J 15/441 |
| 9,828,874 B2 | 11/2017 | Grelin et al. | |
| 10,113,483 B2 | 10/2018 | Manteiga | |
| 10,156,152 B2 | 12/2018 | Accary et al. | |
| 10,196,986 B2 | 2/2019 | Fang et al. | |
| 10,422,341 B2 | 9/2019 | Brault et al. | |
| 2003/0110778 A1 * | 6/2003 | Karafillis | F01D 25/16 60/785 |
| 2003/0213250 A1 | 11/2003 | Pacheco-Tougas et al. | |
| 2010/0077763 A1 | 4/2010 | Alkabie | |
| 2013/0270775 A1 * | 10/2013 | Coffey | F01D 11/003 277/301 |
| 2016/0032765 A1 * | 2/2016 | Shuaib | F01D 11/02 277/348 |
| 2016/0201805 A1 | 7/2016 | Lewis | |
| 2017/0067397 A1 * | 3/2017 | Fang | F01D 11/02 |
| 2017/0292394 A1 | 10/2017 | Duffy et al. | |
| 2020/0032668 A1 * | 1/2020 | Garrison | F16J 15/442 |

FOREIGN PATENT DOCUMENTS

| | | |
|---|---|---|
| CN | 105745400 A | 7/2016 |
| CN | 106499517 A | 3/2017 |
| CN | 107100739 A | 8/2017 |
| CN | 107208685 A | 9/2017 |

\* cited by examiner

SEAL ASSEMBLY FOR A TURBOMACHINE

FEDERALLY SPONSORED RESEARCH

This invention was made with government support under contract number FA8650-07-C-2802 of the Department of the Air Force. The government may have certain rights in the invention.

FIELD

The present subject matter relates generally to turbomachines and, more particular, to a seal assembly for a turbomachine.

BACKGROUND

Turbomachines typically include a rotor assembly, a compressor, and a turbine. The rotor assembly may include a fan having an array of fan blades extending radially outwardly from a rotating shaft. The rotating shaft, which transfers power and rotary motion from the turbine to both the compressor and the rotor assembly, is supported longitudinally using a plurality of bearing assemblies. Known bearing assemblies include one or more rolling elements supported within a paired race. To maintain a rotor critical speed margin, the rotor assembly is typically supported on three bearing assemblies: one thrust bearing assembly and two roller bearing assemblies. The thrust bearing assembly supports the rotor shaft and minimizes axial and radial movement thereof, while the roller bearing assemblies support radial movement of the rotor shaft.

Typically, these bearing assemblies are enclosed within a housing disposed radially around the bearing assembly. The housing forms a compartment or sump that holds a lubricant (e.g., oil) for lubricating the bearing. This lubricant may also lubricate gears and other seals. Gaps between the housing and the rotor shaft are necessary to permit rotation of the rotor shaft relative to the housing. The bearing sealing system usually includes two such gaps: one on the upstream end and another on the downstream end. In this respect, a seal disposed in each gap prevents the lubricant from escaping the compartment. Further, the air around the sump may generally be at a higher pressure than the sump to reduce the amount of lubricant that leaks from the sump. Further, one or more gaps and corresponding seals are generally positioned upstream and/or downstream of the sump to create the higher pressure region surrounding the sump.

Known seals include non-contact seals such as labyrinth or knife-edge seals and contact seals such as carbon seals and piston ring seals. For example, contact seals may be in direct contact with the rotating shaft which may reduce the wear life of the seals and require dedicated cooling thereof. As such, contact seals generally require a cooling lubricant to reduce wear and increase the life of the contact seal. Non-contact seals may define a gap between the seal and the rotating shaft. Non-contact seals, particularly labyrinth seals, may have more leakage compared to other seal types, such as contact seals, but may not require the cooling lubricant.

The sump seals may generally be any type of contact or non-contact seals. For example, the cooling lubricant in the sump may allow for contact seals to be used in the bearing assembly. The higher pressure region, on the other hand, generally does not include a cooling lubricant. As such, the seals enclosing the high pressure region surrounding the sump may be restricted to non-contact seals that do not require a cooling lubricant. Further, labyrinth seals may generally be used to enclose the high pressure region. As such, the high pressure region may suffer from leaks due to the gap in the labyrinth seals and corresponding inefficiencies.

Accordingly, a seal system for a turbomachine that may reduce leaks from the higher pressure region and that increases efficiency would be welcome in the art.

BRIEF DESCRIPTION

Aspects and advantages will be set forth in part in the following description, or may be obvious from the description, or may be learned through practice of the invention.

In one aspect, the present disclosure is direct to a seal assembly for a turbomachine. The turbomachine includes a rotating shaft extending along a centerline and a fixed housing positioned exterior to the rotating shaft in a radial direction relative to the centerline. The seal assembly includes a sump housing, a bearing, a sump seal, a pressurized housing, and a non-contacting carbon seal. The sump housing includes at least a portion of the rotating shaft and the fixed housing. Further, the sump housing at least partially defines a bearing compartment for holding a cooling lubricant therein. The bearing supports the rotating shaft and is in contact with an exterior surface of the rotating shaft and an interior surface of the fixed housing and positioned within the sump housing. The sump seal is positioned between the rotating shaft and the fixed housing and at least partially defines the bearing compartment for holding the cooling lubricant. The pressurized housing is positioned exterior to the sump housing and includes at least a portion of the rotating shaft and the fixed housing. In addition, the pressurized housing defines a pressurized compartment to at least partially enclose the sump housing. The non-contacting carbon seal is positioned between the rotating shaft and the fixed housing and at least partially defining the pressurized compartment to enclose the sump housing.

In one embodiment, non-contacting carbon seal may be a hydrodynamic seal. In another embodiment, the non-contacting carbon seal may be an archbound seal. In a still further embodiment, the non-contacting carbon seal may be a bushing seal. In a further embodiment, the sump seal may be a first sump seal. In such an embodiment, a second sump seal may be positioned between the rotating shaft and the fixed housing and at least partially defining the compartment for holding the cooling lubricant. In additional embodiments, the non-contacting carbon seal may be a first non-contacting carbon seal. In such embodiments, the seal assembly may further include a second non-contacting carbon seal positioned between the rotating shaft and the fixed housing and at least partially defining the pressurized compartment to enclose the sump housing.

In a further embodiment, the sump seal may be a carbon seal. In another embodiment, the sump seal may be a labyrinth seal. In other embodiments, the sump seal may be a brush seal. In still further embodiments, the sump seal may be a hydrodynamic seal. In one exemplary embodiment, the bearing may be a thrust bearing supporting the rotating shaft from loads in an axial direction relative to the centerline. In another embodiment, the bearing may be a radial bearing supporting the rotating shaft from loads in a radial direction relative to the centerline.

In another aspect, the present disclosure is direct to a turbomachine defining a centerline extending along a length of the turbomachine. The turbomachine includes a compressor, a turbine, a rotating shaft extending along the centerline and coupling the compressor and the turbine, a fixed housing extending along the centerline and positioned exterior to the rotating shaft in a radial direction relative to the centerline, and a seal assembly. The seal assembly includes a sump housing, a bearing, a sump seal, a pressurized housing, and a non-contacting carbon seal. The sump housing includes at least a portion of the rotating shaft and the fixed housing. Further, the sump housing at least partially defines a bearing compartment for holding a cooling lubricant therein. The bearing supports the rotating shaft and is in contact with an exterior surface of the rotating shaft and an interior surface of the fixed housing and positioned within the sump housing. The sump seal is positioned between the rotating shaft and the fixed housing and at least partially defines the bearing compartment for holding the cooling lubricant. The pressurized housing is positioned exterior to the sump housing and includes at least a portion of the rotating shaft and the fixed housing. In addition, the pressurized housing defines a pressurized compartment to at least partially enclose the sump housing. The non-contacting carbon seal is positioned between the rotating shaft and the fixed housing and at least partially defining the pressurized compartment to enclose the sump housing.

In one embodiment, the turbomachine may further include a compressor bleed conduit fluidly coupling the compressor to the pressurized compartment. In such an embodiment, the compressor may include a high pressure compressor and a booster compressor. In addition, the compressor bleed conduit may fluidly couple the pressurized compartment to the booster compressor. In a further embodiment, the compressor bleed conduit may fluidly couple the pressurized compartment to the high pressure compressor.

It should be further understood that the turbomachine may further include any of the additional features as described herein.

These and other features, aspects and advantages will become better understood with reference to the following description and appended claims. The accompanying drawings, which are incorporated in and constitute a part of this specification, illustrate embodiments of the invention and, together with the description, serve to explain certain principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended FIGS., in which.

Figure 1:
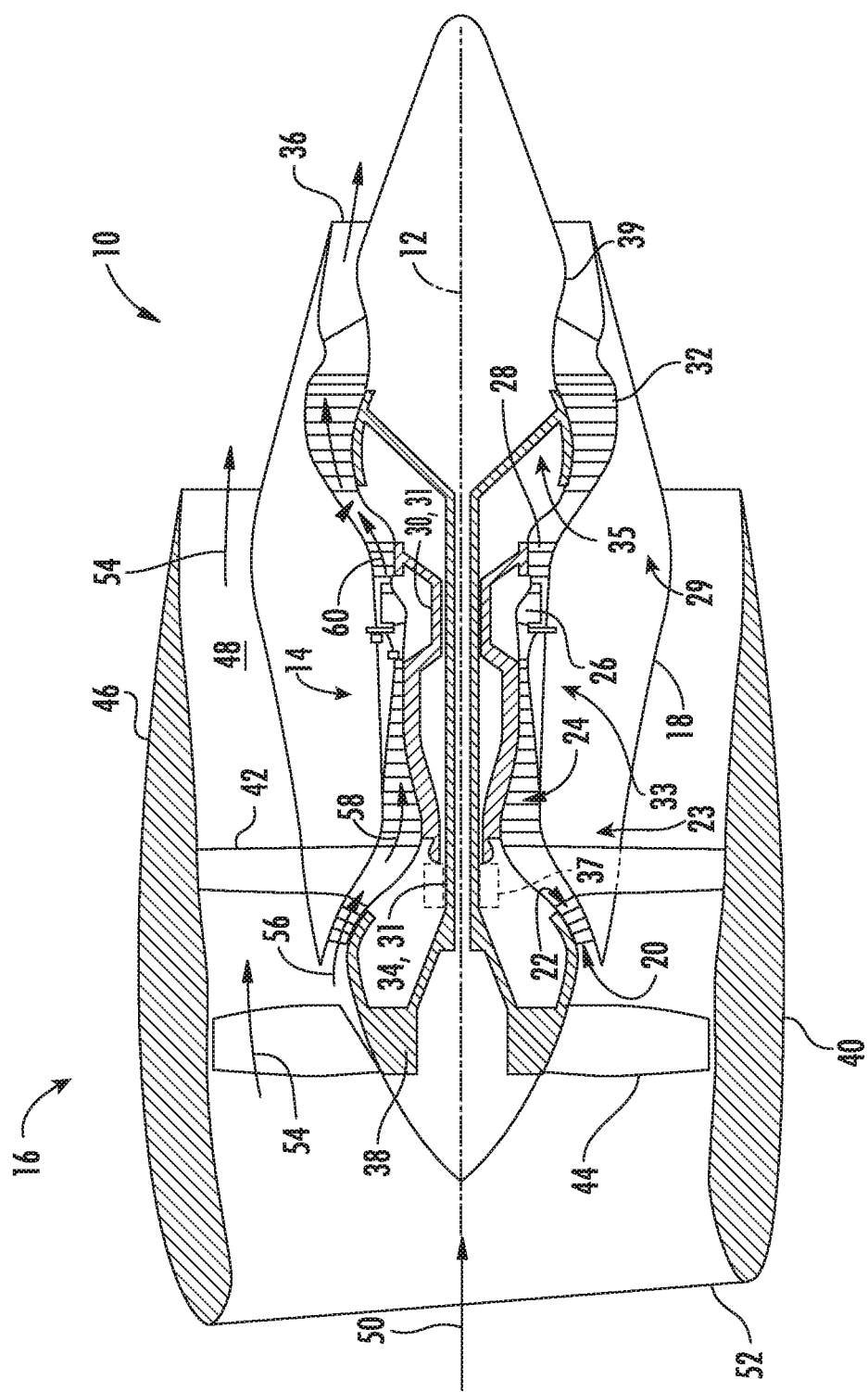
FIG. 1 illustrates a turbomachine according to aspects of the present disclosure, particularly illustrating a turbomachine configured a gas turbine engine.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached to," and the like refer to both direct coupling, fixing, or attaching, as well as indirect coupling, fixing, or attaching through one or more intermediate components or features, unless otherwise specified herein.

The terms "communicate," "communicating," "communicative," and the like refer to both direct communication as well as indirect communication such as through a memory system or another intermediary system.

A seal assembly for a turbomachine is generally provided. The turbomachine may include a rotating shaft extending along a centerline and a fixed housing positioned exterior to the rotating shaft in a radial direction relative to the centerline. The seal assembly may include a sump housing at least partially defining a bearing compartment for holding a cooling lubricant. The seal assembly may further include a bearing supporting the rotating shaft. In addition, the seal assembly may also include a sump seal at least partially defining the bearing compartment. A pressurized housing of the seal assembly may be positioned exterior to the sump housing and define a pressurized compartment to at least partially enclose the sump housing. Further, a non-contacting carbon seal may be positioned between the rotating shaft and the fixed housing to at least partially define the pressurized compartment to enclose the sump housing.

In certain embodiments, a seal assembly including the non-contacting carbon seal may allow for a more efficient turbomachine. A non-contacting carbon seal may allow for a closer clearance than traditional labyrinth seals. As such, less pressurized air may escape from the pressurized compartment. Such an embodiment may allow for less pressurized air to be bled from the working flowpath of the turbomachine. For example, a non-contacting seal formed from carbon may be able to withstand incidental contact and/or rubbing with the rotating shaft that would be undesirable for other non-contacting seals. Further, a carbon seal that is generally a non-contacting seal may be able to operate in an environment without lubrication, such as the seal(s) defining the pressurized compartment. In addition, certain embodiments where the non-contacting carbon seal is a hydrodynamic seal and/or an archbound seal may allow for the seal clearance to be further reduced, further increasing the efficiency of the turbomachine.

It should be appreciated that, although the present subject matter will generally be described herein with reference to a gas turbine engine, the disclosed systems and methods may generally be used on bearings and/or seals within any suitable type of turbine engine, including aircraft-based turbine engines, land-based turbine engines, and/or steam turbine engines. Further, though the present subject matter is generally described in reference to a high pressure spool of a turbine engine, it should also be appreciated that the disclosed system and method can be used on any spool within a turbine engine, e.g., a low pressure spool or an intermediate pressure spool.

Referring now to the drawings, FIG. 1 illustrates a cross-sectional view of one embodiment of a turbomachine 10. More particularly, FIG. 1 depicts a turbomachine 10 configured as a gas turbine engine that may be utilized within an aircraft in accordance with aspects of the present subject matter. The gas turbine engine is shown having a longitudinal or axial centerline axis 12 extending therethrough for reference purposes. In general, the engine may include a core gas turbine engine (indicated generally by reference character 14) and a fan section 16 positioned upstream thereof. The core engine 14 may generally include a substantially tubular outer casing 18 that defines an annular inlet 20. In addition, the outer casing 18 may further enclose and support a compressor section 23. For the embodiment show, the compressor section 23 includes a booster compressor 22 and a high pressure compressor 24. The booster compressor 22 generally increases the pressure of the air (indicated by arrow 54) that enters the core engine 14 to a first pressure level. The high pressure compressor 24, such as a multi-stage, axial-flow compressor, may then receive the pressurized air (indicated by arrow 58) from the booster compressor 22 and further increase the pressure of such air. The pressurized air exiting the high pressure compressor 24 may then flow to a combustor 26 within which fuel is injected into the flow of pressurized air, with the resulting mixture being combusted within the combustor 26.

For the embodiment illustrated, the outer casing 18 may further enclose and support a turbine section 29. Further, for the depicted embodiment, the turbine section 29 includes a first, high pressure turbine 28 and second, low pressure turbine 32. For the illustrated embodiments, one more of the compressors 22, 24 may be drivingly coupled to one or more of the turbines 28, 32 via a rotating shaft 31 extending along the centerline 12. For example, high energy combustion products 60 are directed from the combustor 26 along the hot gas path of the engine to the high pressure turbine 28 for driving the high pressure compressor 24 via a first, high pressure drive shaft 30. Subsequently, the combustion products 60 may be directed to the low pressure turbine 32 for driving the booster compressor 22 and fan section 16 via a second, low pressure drive shaft 34 generally coaxial with high pressure drive shaft 30. After driving each of turbines 28 and 32, the combustion products 60 may be expelled from the core engine 14 via an exhaust nozzle 36 to provide propulsive jet thrust. Further, the rotating shaft(s) 31 may be enclosed by a fixed housing 39 extending along the centerline 12 and positioned exterior to the rotating shaft(s) 31 in a radial direction relative to the centerline 12.

Additionally, as shown in FIG. 1, the fan section 16 of the engine may generally include a rotatable, axial-flow fan rotor assembly 38 surrounded by an annular fan casing 40. It should be appreciated by those of ordinary skill in the art that the fan casing 40 may be supported relative to the core engine 14 by a plurality of substantially radially-extending, circumferentially-spaced outlet guide vanes 42. As such, the fan casing 40 may enclose the fan rotor assembly 38 and its corresponding fan blades 44. Moreover, a downstream section 46 of the fan casing 40 may extend over an outer portion of the core engine 14 so as to define a secondary, or by-pass, airflow conduit 48 providing additional propulsive jet thrust.

It should be appreciated that, in several embodiments, the low pressure drive shaft 34 may be directly coupled to the fan rotor assembly 38 to provide a direct-drive configuration. Alternatively, the low pressure drive shaft 34 may be coupled to the fan rotor assembly 38 via a speed reduction device 37 (e.g., a reduction gear or gearbox or a transmission) to provide an indirect-drive or geared drive configuration. Such a speed reduction device(s) 37 may also be provided between any other suitable shafts and/or spools within the engine as desired or required.

During operation of the engine, it should be appreciated that an initial airflow (indicated by arrow 50) may enter the engine through an associated inlet 52 of the fan casing 40. For the illustrated embodiment, the airflow 50 then passes through the fan blades 44 and splits into a first compressed airflow (indicated by arrow 54) that moves through the by-pass airflow conduit 48 and a second compressed airflow (indicated by arrow 56) which enters the booster compressor 22. In the depicted embodiment, the pressure of the second compressed airflow 56 is then increased and enters the high pressure compressor 24 (as indicated by arrow 58). After mixing with fuel and being combusted within the combustor 26, the combustion products 60 may exit the combustor 26 and flow through the high pressure turbine 28. Thereafter, for the shown embodiment, the combustion products 60 flow through the low pressure turbine 32 and exit the exhaust nozzle 36 to provide thrust for the engine.

Figure 2:
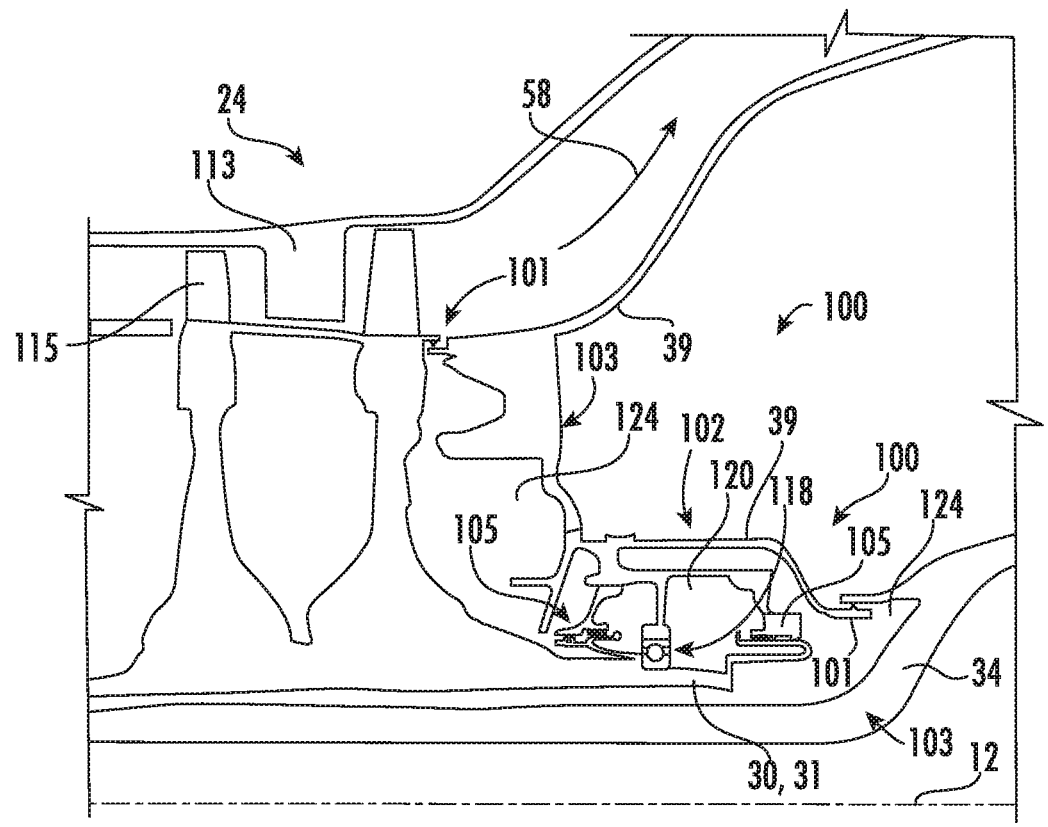
FIG. 2 illustrates one embodiment of a compressor and a sump for a turbomachine according to aspects of the present disclosure, particularly illustrating a seal assembly.

Referring now to FIG. 2, one embodiment of a compressor and a sump for a turbomachine 10 is illustrated according to aspects of the present disclosure, particularly illustrating a seal assembly 100. For example, the turbomachine 10 may be the gas turbine engine of FIG. 1, and the compressor may be the high pressure compressor 24 depicted in FIG. 1. Though it should be recognized that the turbomachine 10 may be any other suitably configured turbomachine. For the illustrated embodiment, the high pressure compressor 24 may include one or more stators 113 coupled to the outer casing 18 and one or more rotors 115 coupled to the rotating shaft 31, such as the high pressure drive shaft 30, configured to increase the pressure of the airflow 50.

The seal assembly 100 may generally isolate a sump housing 102 from the rest of the turbomachine 10. As such, the seal assembly 100 includes the sump housing 102. The sump housing 102 includes at least a portion of the rotating shaft 31 and the fixed housing 39. For example, the fixed housing 39 may include various intermediary components or parts extending from the fixed housing 39 to form a portion of the sump housing 102. Such intermediary components parts may be coupled to the fixed housing 39 or formed integrally with the fixed housing 39. Similarly, the rotating shaft 31 may also include various intermediary components extending from the rotating shaft 31 to form the sump housing. Further, the sump housing 102 at least partially defines a bearing compartment 120 for holding a cooling lubricant (not shown). For instance, the sump housing 102 at least partially radially encloses the cooling lubricant and a bearing 118 (as described in more detail in regards to FIG. 3). The cooling lubricant (e.g., oil) for lubricating the various components of the bearing 118 may circulate through the bearing compartment 120. The seal assembly 100 may include one or more sump seals 105 (as described in more detail in reference to FIGS. 3 and 4) at least partially defining the bearing compartment 120 for holding the cooling lubricant.

The seal assembly 100 further includes a pressurized housing 103 positioned exterior to the sump housing 102. The pressurized housing may at least partially enclose the sump housing 102. For example, as illustrated, the pressurized housing 103 may be positioned both forward and aft relative to the centerline 12 of the sump housing 102. The pressurized housing 103 may include at least a portion of the rotating shaft 31 and the fixed housing 39 or intermediary components extending from the rotating shaft 31 and/or the fixed housing 39. For example, the pressurized housing may be formed at least partially by the high pressure drive shaft 30 and the fixed housing 39 both forward and aft of the sump housing 102.

For the depicted embodiment, the pressurized housing 103 defines a pressurized compartment 124 to at least partially enclose the sump housing 102. In the exemplary embodiment, bleed air from the compressor section 23, the turbine section 29, and/or the fan section 16 may pressurize the pressurized compartment 124 to a pressure relatively greater than the pressure of the bearing compartment 120. As such, the pressurized compartment 124 may prevent or reduce the amount of any cooling lubricant leaking from the sump housing 102 across the sump seal(s) 105.

Further, the seal assembly 100 may include one or more seals to further partially define the pressurized compartment 124 (such as the non-contacting carbon seal(s) 101 as described in more detail in regards to FIGS. 5-17). For instance, one or more non-contacting carbon seal(s) 101 may be positioned between the rotating shaft 31 and the fixed housing 39.

Figure 3:
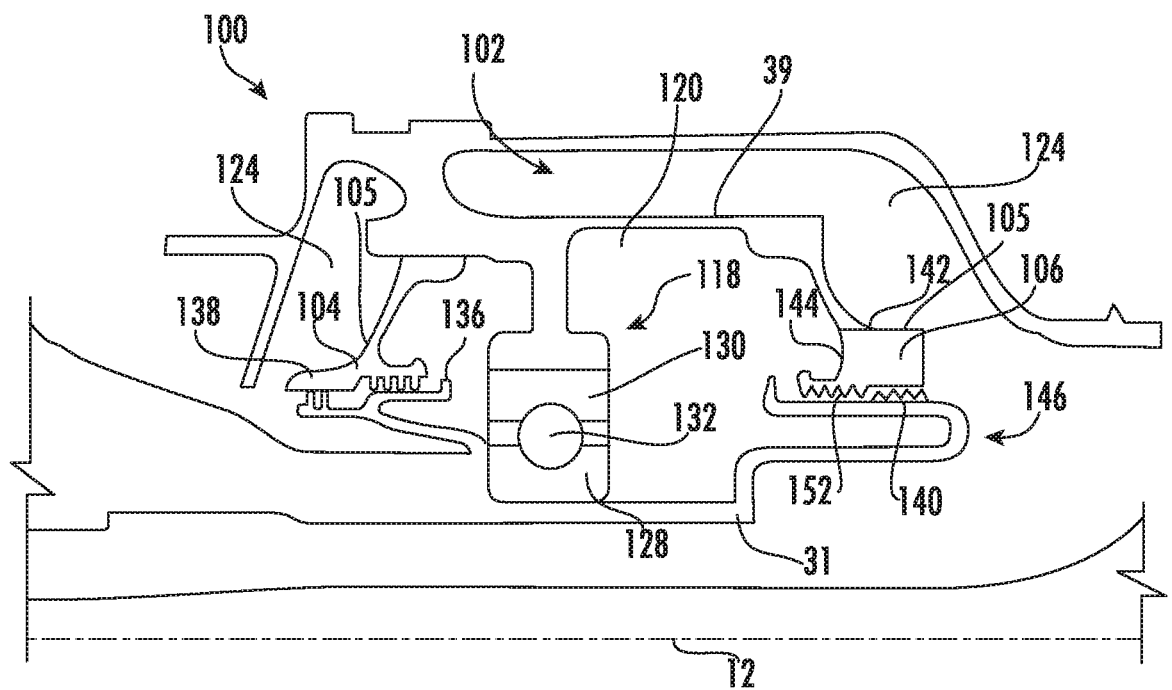
FIG. 3 illustrates a closer view of a sump housing according to aspects of the present disclosure.

Referring now to FIG. 3, a closer view of the sump housing 102 is illustrated according to aspects of the present disclosure. In the illustrated embodiment, the seal assembly 100 includes the bearing 118. The bearing 118 may be in contact with an exterior surface of the rotating shaft 31 and an interior surface of the fixed housing 39. It should be recognized that the rotating shaft 31 may be the high pressure drive shaft 30 or the low pressure drive shaft 34 described in regards to FIG. 1 or any other rotating drive shaft of the turbomachine 10. The bearing 118 may be positioned radially between the portion of the rotating shaft 31 and the portion of the fixed housing 39 that form the sump housing 102. As such, the bearing 118 may be positioned within the sump housing 102. The bearing 118 may support the rotating shaft 31 relative to various fixed components in the engine.

In the depicted embodiment, the bearing 118 may be a thrust bearing. That is, the bearing 118 may support the rotating shaft 31 from loads in the axial, or the axial and radial directions relative to the centerline 12. For example, the bearing 118 may include an inner race 128 extending circumferentially around an outer surface of the rotating shaft 31. In the shown embodiment, an outer race 130 is disposed radially outward from the inner race 128 and mates with the fixed housing 39, such as an interior surface of the sump housing 102. The inner and outer races 128, 130 may have a split race configuration. For the depicted embodiment, the inner and outer race 128, 130 may sandwich at least one ball bearing 132 therebetween. Preferably, the inner and outer races 128, 130 sandwich at least three ball bearings 132 therebetween.

In additional embodiments, the bearing 118 may be a radial bearing. That is, the bearing 118 may support the rotating shaft 31 from loads generally in the radial direction relative to the centerline 12. In other embodiments, the inner race 128 and outer race 130 may sandwich at least one cylinder, cone, or other shape to form the bearing 118.

Still referring to FIG. 3, the seal assembly may include two sump seals 105. Each of a first and second sump seals 105 may be positioned between the rotating shaft 31 and the fixed housing 39 to at least partially define the bearing compartment 120 for housing the cooling lubricant and the bearing 118. For example, the first sump seal 105 may be positioned forward of the bearing 118, and the second sump seal 105 may be positioned aft of the bearing 118. For the illustrated embodiment, the first sump seal 105 may be a labyrinth seal 104, and the second sump seal 105 may be a carbon seal 106. Although, the two seals may be any suitable type of seal, and, in other embodiments, the sealing system may include further sump seals 105, such as three or more. For example, in other embodiments, multiple lab seals, carbon seals, and/or hydrodynamic seals may be utilized in the sump housing 102 in any arrangement.

FIG. 3 also more closely illustrates the labyrinth seal 104 and the carbon seal 106. For the embodiment depicted, the labyrinth seal 104 and the carbon seal 106 (such as a hydrodynamic seal) are non-contact seals, which do not require contact between the stationary and moving components when operating at high speed. Non-contact seals typically have a longer service life than contact seals. Still, in other embodiments, one or both of the seals may be contact seal. Each type of seal may operate in a different manner. For the depicted embodiment, the labyrinth seal 104 includes inner surface 136 (coupled to the rotating shaft 31) and an outer surface 138 (coupled to the fixed housing 39). For example, a tortuous path (not shown) extending between the inner and outer surfaces 136, 138 prevents the cooling lubricant from escaping the sump housing 102. For the exemplary embodiment shown, the air pressure on an outer side of the labyrinth seal 104 (i.e., in the pressurized compartment 124) is greater than the air pressure on the inner side of the labyrinth seal 104 (i.e., in the bearing compartment 120). In this respect, the stationary and rotating components may be separated by an air film during relative rotation therebetween.

For the embodiment shown, the carbon seal 106 may be a hydrodynamic seal. For example, one or more grooves 140 may separate the stationary and rotating components. The air pressure on an outer side 142 of the carbon seal 106 (i.e., in the pressurized compartment 124) may be greater than the air pressure on an inner side 144 of the carbon seal 106 (i.e., in the bearing compartment 120). As such, for the embodiment shown, air from the high pressure compartment 124 flows through the grooves 140 into the bearing compartment 120, thereby creating an air film between the stationary and rotating components. Additionally, the carbon seal 106 may include a windback 152 that reduces the amount of lubricant that reaches the grooves 140. Still, in other embodiments, the carbon seal 106 may be a contacting carbon seal.

In one embodiment, the carbon seal 106 is proximate to and in sealing engagement with a hairpin member 146 of the rotating shaft 31. In this respect, the hairpin member 146 may contact the carbon seal 106 when the rotating shaft 31 is stationary or rotating at low speeds. Though it should be recognized that the carbon seal 106 may be in sealing engagement with any other part or component of the rotating shaft 31. Nevertheless, for the illustrated hydrodynamic, carbon seal 106, the carbon seal 106 lifts off of the rotating shaft 31 and/or the hairpin member 146 when the rotating shaft 31 rotates at sufficient speeds.

Figure 4:
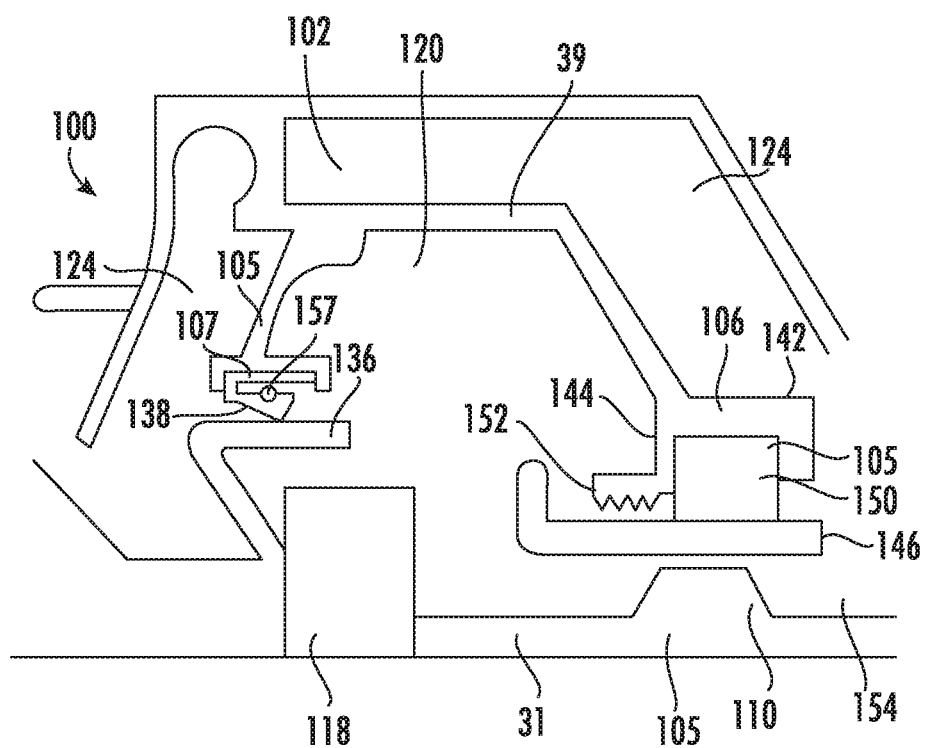
FIG. 4 illustrates another embodiment of the sump housing of the seal assembly according to aspects of the present disclosure, particularly illustrating a sump housing with three sump seals.

Referring now to FIG. 4, another embodiment of the sump housing 102 of the seal assembly 100 is illustrated according to aspects of the present disclosure. The sump housing 102 of FIG. 4 particularly illustrates a sump housing 102 with three sump seals 105. The sump housing 102 may generally be configured as the sump housing 102 of FIG. 3. For example, the sump housing 102 may include a portion of the rotating shaft 31, a portion of the fixed housing 39, and enclose the bearing 118. Further, the sump seals 105 and the sump housing 102 at least partially define the bearing compartment 120.

In the embodiment illustrated, one of the sump seals 105 is a contacting lip seal 107. As such, the inner surface 136 and the outer surface 138 may be in contact in order to seal the sump housing 102. Further, a spring 157 may be in compression between the outer surface 138 and the fixed housing 39 to maintain contact between the inner and outer surfaces 136, 138. The illustrated embodiment further includes a carbon seal 106 configured as a contacting carbon seal. As such, the carbon seal 106 includes a carbon element 150 in sealing engagement with the rotating shaft 31. For the embodiment depicted, the carbon element 150 may engage the hairpin member 146 of the rotating shaft 31. Additionally, the carbon seal 106 may include a windback 152 that reduces the amount of the cooling lubricant that reaches the carbon element 150. Further, one of the sump seals 105 may be an open gap seal 110. For instance, the pressure on an outer side 154 (such as the pressurized compartment 124) may be greater than the pressure of the bearing compartment 120 and thus reduce the leakage of cooling lubricant through the open gap seal 110. In further embodiments, one of the sump seals 105 may be a brush seal. In such embodiments, the brush seal may contain a plurality of bristles (such as carbon bristles) in sealing engagement between the rotating shaft 31 and the fixed housing 39.

Referring now generally to FIGS. 5-16, multiple views of various embodiments of non-contacting carbon seals 101 for the seal assembly 100 are illustrated according to the present subject matter. The non-contacting carbon seal 101 may be positioned between the rotating shaft 31 and the fixed housing 39 to at least partially define the pressurized compartment 124 to enclose the sump housing 102, as described in regards to FIG. 2. Generally, the non-contacting carbon seal 101 may be a circumferential seal. That is, the non-contacting carbon seal 101 includes an inner sealing surface 108 oriented in the radial direction. Further, the inner sealing surface 108 may be separated from the rotating shaft 31 by a radial gap 112. The non-contacting carbon seal 101 is generally formed from carbon and/or a composition including carbon. In certain embodiments, the seal defining the pressurized housing 103 may be a seal separating air on each side of the seal, such as shown in FIG. 2. For example, there may be no cooling lubricant on either side of the seal in order to cool and/or lubricate the seal. As such, contacting carbon seals may be inappropriate as the seal may suffer from excessive wear without the cooling lubricant.

For these reasons, the seal defining the pressurized compartment 124 may be a non-contacting seal. Specifically, for certain turbomachines, the non-contacting seal is a labyrinth seal formed from a metal or metal alloy. Many non-contacting seals include a large radial gap 112 to avoid incidental contact and wear between the seal and the rotating shaft 31. The non-contacting carbon seal 101 of the seal assembly 100 may allow for a reduced radial gap 112 even in an air-air environment. For example, the non-contacting carbon seal 101 formed from carbon may be able to withstand incidental contact with the rotating shaft 31 for short periods of time without a cooling lubricant supply. The radial gap 112 may therefore be reduced leading to a more efficient non-contacting seal. For example, a smaller radial gap 112 may lead to less pressurized air escaping the pressurized housing 103. Further, less air may be required from the compressors 22, 24 and/or turbines 28, 32 to pressurize the pressurized housing 103, leading to a more efficient turbomachine 10.

Figure 5:
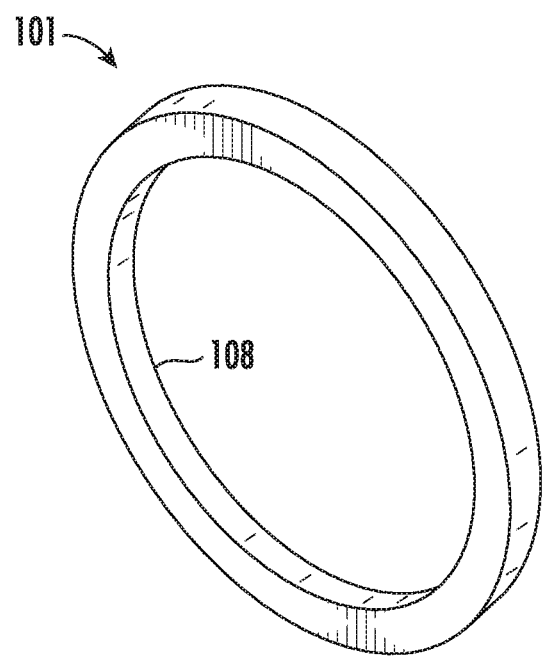
FIG. 5 illustrates one embodiment of a non-contacting carbon seal according to aspects of the present disclosure, particularly illustrating an embodiment where the non-contacting carbon seal is a bushing seal.
Figures 6, 7:
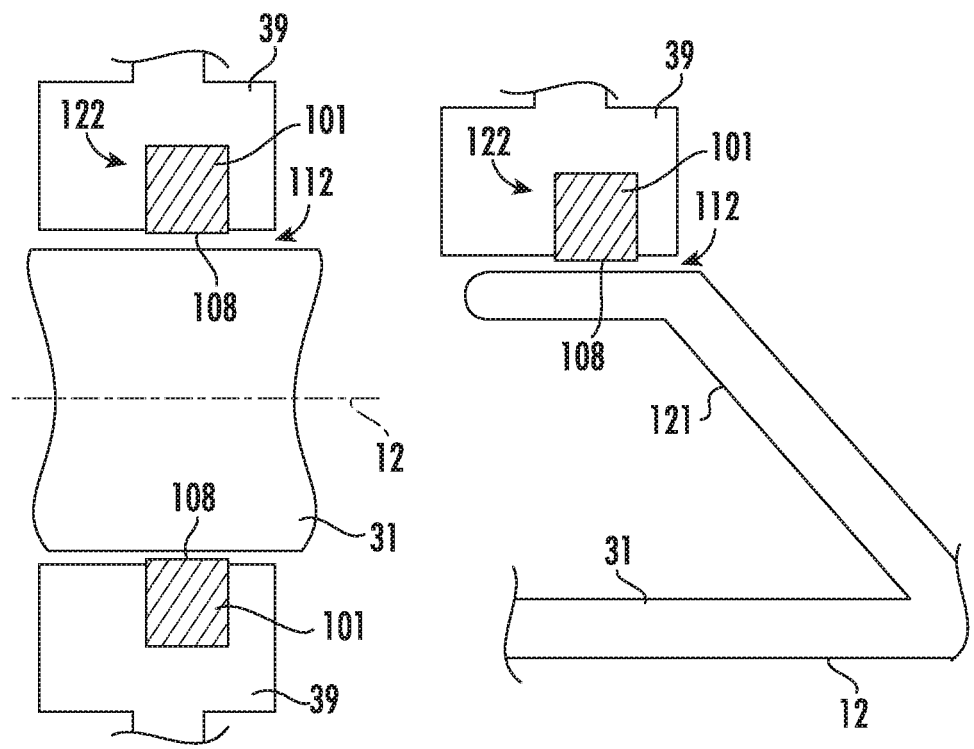
FIG. 6 illustrates a bushing seal assembled with a rotating shaft according to aspects of the present disclosure.
FIG. 7 illustrates another embodiment of the bushing seal according to aspects of the present disclosure, particularly illustrating the bushing seal assembled indirectly with the rotating shaft.

Referring now to FIG. 5, one embodiment of the non-contacting carbon seal 101 is illustrated according to the present subject matter. FIG. 5 particularly illustrates an embodiment where the non-contacting carbon seal 101 is a bushing seal. The bushing seal may be formed as a ring with a circular shape or cross-section. FIG. 6 illustrates the bushing seal assembled with the rotating shaft 31. As shown in the depicted embodiment, the bushing seal may be positioned between the rotating shaft 31 and the fixed housing 39 in order to partially define the pressurize compartment 124 to enclose the sump housing 102 (as described in regards to FIG. 2).

For the embodiment depicted, the bushing seal may be coupled with the fixed housing 39. For example, the fixed housing 39 may define a slot 122 for receiving the bushing seal. One or more suitable mechanical fasteners (e.g., bolts, screws and/or the like) may be used to secure the bushing seal to the fixed housing 39. However, in alternative embodiments, the bushing seal may be coupled to the fixed housing 39 using any other suitable means, such as by adhering the bushing seal to the fixed housing 39. It should be recognized that the bushing seal may be coupled to the fixed housing 39 through any intermediary structure. Referring particularly to FIG. 7, one embodiment of the seal assembly 100 is illustrated where the bushing seal is assembled indirectly with the rotating shaft 31. For example, the rotating shaft 31 may include a rotating surface 121 formed integrally with or coupled to the rotating shaft 31.

The bushing seal may partially define the pressurized compartment 124 via sealing engagement with the rotating shaft 31. For example, the size of the radial gap 112 may be small enough that fluid shear stress approximately creates a seal at the radial gap 112. For example, the rotating shaft 31 may create a fluid shear stress boundary condition on the air in the radial gap 112 such that air leaking from the pressurized compartment 124 is reduced. Further, it should be recognized that by creating the bushing seal from carbon and/or carbon composition the radial gap 112 may be reduced. The reduced radial gap 112 may allow for a more efficient bushing seal where the shear stress boundary condition includes more of or all of the radial gap 112. In certain embodiments, the rotating shaft 31 and fixed housing 39 may be arranged such that the radial gap 112 is approximately consistent at various circumferential locations along the rotating shaft 31 and/or the fixed housing 39. As such, a larger radial gap 112 may be necessary comparted to other non-contacting carbon seals 101, as described below in reference to FIGS. 8-16.

Further, in certain embodiment, it should be recognized that the seal assembly 100 may include a plurality of bushing seals positioned between the rotating shaft 31 and the fixed housing 39. For example, two more bushing seals may be positioned in a series arrangement along the rotating shaft 31 to create a better seal defining the pressurized compartment 124.

Figures 8, 9:
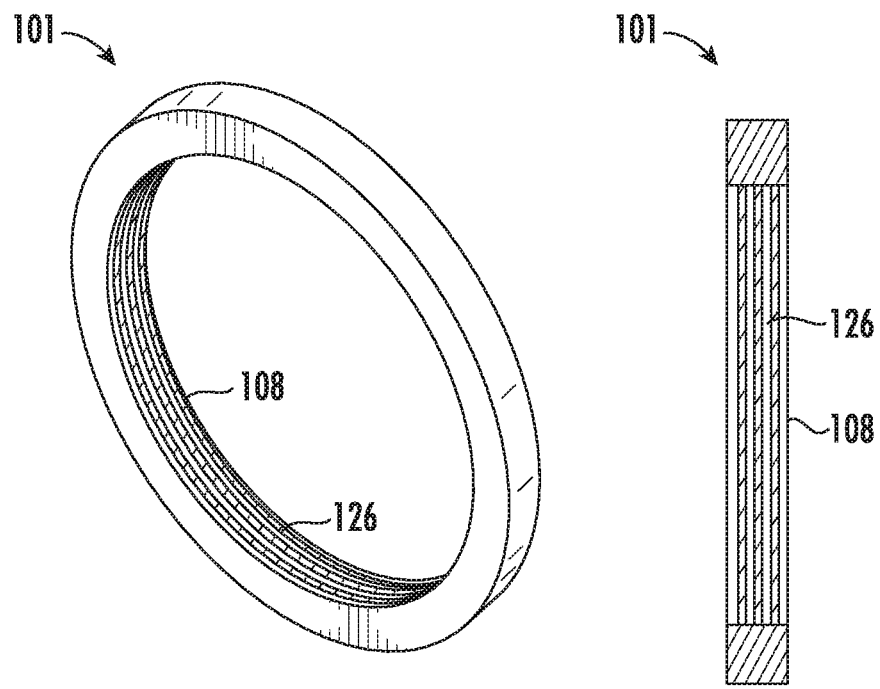
FIG. 8 illustrates another embodiment of the non-contacting carbon seal according to aspects of the present disclosure, particularly illustrating an embodiment where the non-contacting carbon seal is a hydrodynamic seal.
FIG. 9 illustrates a cross-sectional view of the hydrodynamic seal of FIG. 8 according to aspects of the present disclosure, particularly illustrating a plurality of hydrodynamic grooves of the hydrodynamic seal.

Referring now to FIGS. 8 and 9, another embodiment of the non-contacting carbon seal 101 is illustrated according to aspects of the present disclosure. Particularly, FIG. 8 illustrates an embodiment where the non-contacting carbon seal 101 is a hydrodynamic seal. FIG. 9 illustrates a cross-sectional view of the non-contacting carbon seal 101 of FIG. 8, particularly illustrating hydrodynamic grooves 126. It should be recognized that the hydrodynamic seal may be utilized in the seal assembly 100 as described generally in regards to FIG. 2 or any other capable system. Further, the hydrodynamic seal may be coupled to the fixed housing 39 as generally described in regards to FIGS. 6 and 7. For example, the hydrodynamic seal may be recessed in a slot 122 and may be in sealing engagement with the rotating shaft 31 and/or the rotating surface 121.

In the illustrated embodiment, the hydrodynamic seal may include one or more hydrodynamic grooves 126 on the inner sealing surface 108. In general, the hydrodynamic grooves 126 may act as pump to create an air film on the rotating shaft 31. It should be recognized that the air film may define the radial gap 112. For example, the rotating shaft 31 may ride on the air film instead of contacting the inner sealing surface 108. Generally, as the rotating shaft 31 rotates, fluid shear may direct air in the radial gap 112 into the hydrodynamic groove(s) 126. For example, air may be sucked in by the hydrodynamic grooves 126 from the pressurized compartment 124 and/or any compartment opposite the pressurized compartment 124. As air is directed into the hydrodynamic grooves 126, the air may be compressed until it exits the hydrodynamic groove(s) 126 and forms the air film to separate the rotating shaft 31 and the non-contacting carbon seal 101.

In many embodiments, the rotating shaft 31 may contact the hydrodynamic seal while the turbomachine 10 is not running or the rotating shaft 31 is at low speeds. As the speed of the rotating shaft 31 increases, the hydrodynamic groove(s) 126 may compress more air and create a more robust air film that lifts the rotating shaft 31 off of the hydrodynamic seal. It should be recognized that, by creating the radial gap 112 using they hydrodynamic grooves 126, the size of the radial gap may be reduced in comparison to other non-contact seals, such as the bushing seal described in FIGS. 5-7.

Figure 10:
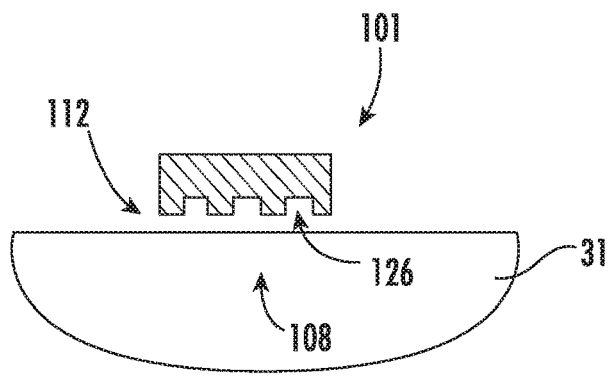
FIG. 10 illustrates a closer, cross-sectional view of the hydrodynamic seal of FIGS. 8 and 9 according to aspects of the present disclosure, particularly illustrating the hydrodynamic grooves.
Figure 11:
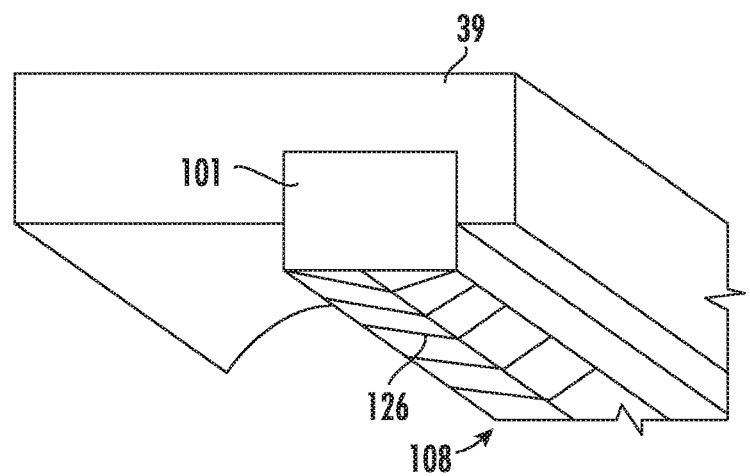
FIG. 11 illustrates another embodiment of the hydrodynamic seal coupled to a fixed housing, particularly illustrating a hydrodynamic seal with slanted, hydrodynamic grooves.
Figure 12:
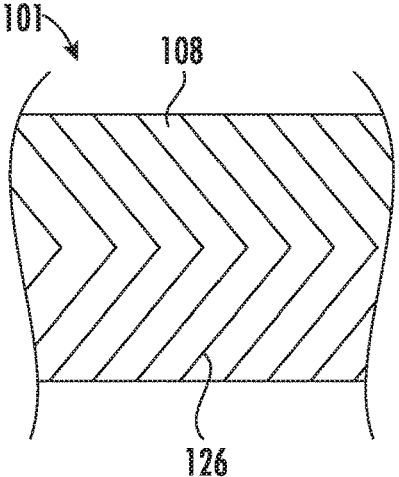
FIG. 12 illustrates another view of the hydrodynamic seal of FIG. 11 according to aspects of the present disclosure, particularly illustrating the slanted, hydrodynamic grooves.

Referring now to FIG. 10-12, multiple views are illustrated of various embodiments of the hydrodynamic groove(s) 126. FIG. 10 illustrates a cross-sectional view of the hydrodynamic seal of FIGS. 8 and 9 particularly illustrating the hydrodynamic grooves 126. As shown, the hydrodynamic grooves 126 are generally oriented in the circumferential direction relative to the centerline 12 (see, e.g., FIG. 2). FIGS. 11 and 12 are two views of another embodiment of a hydrodynamic seal particularly illustrating slanted hydrodynamic grooves 126. Particularly, FIG. 11 illustrates a hydrodynamic seal coupled to the fixed housing 39, and FIG. 12 illustrates a view of the inner sealing surface 108. As shown, the hydrodynamic grooves 126 may be oriented at least partially in the axial direction relative to the centerline 12. As such, the hydrodynamic seal with slanted, hydrodynamic grooves 126 may direct the air used to form the air film and/or the radial gap 112 back into the pressurized compartment 124, thereby further increasing the efficiency of the non-contact carbon seal 101 and the turbomachine 10. It should be recognized that, in other embodiments, the hydrodynamic grooves 126 may have any other configuration and/or orientation that creates an air film when the rotating shaft 31 is rotated at sufficient speeds.

Figure 13:
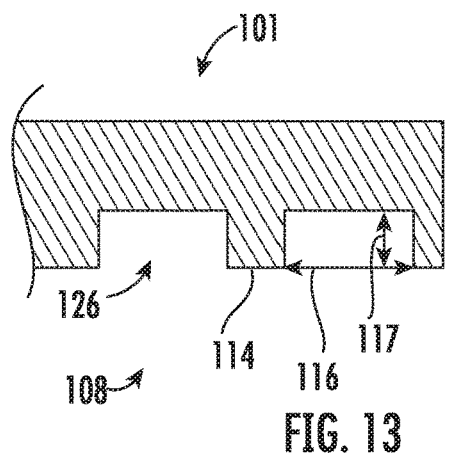
FIG. 13 illustrates another embodiment of the hydrodynamic grooves according to aspects of the present disclosure.

Referring now to FIG. 13, one embodiment of the hydrodynamic grooves 126 is illustrated according to aspects of the present disclosure. For instance, the hydrodynamic grooves 126 of FIG. 13 may be utilized in any of the embodiments of FIGS. 8-12 or any other capable system. As shown, one or more tongues 114 may separate the hydrodynamic grooves 126 on the inner sealing surface 108. Further, the hydrodynamic grooves 126 may define a groove width 116 and a groove depth 117. In certain embodiments, a change in the groove width 116 and/or groove depth 117 may compress air directed into the hydrodynamic groove(s) 126 and thus form the air film in the radial gap 112. For example, the groove depth 117 may reduce along a length of the hydrodynamic groove 126 to compress and/or accelerate the air to form the air film. Similarly, the groove width 116 may also reduce in order to compress the air directed to the hydrodynamic groove 126. In some embodiments, one or both of the groove width and depth 116, 117 may reduce in order to compress the air and form the air film. In further embodiments, the groove depth 117 may reduce to approximately zero (e.g., form a flat surface with the inner sealing surface 108) and dispatch the compressed air into the radial gap 112. In still further embodiments, the groove depth 117 may abruptly decrease at an end of the hydrodynamic groove 126 (such as at a stop or bump).

Figure 14:
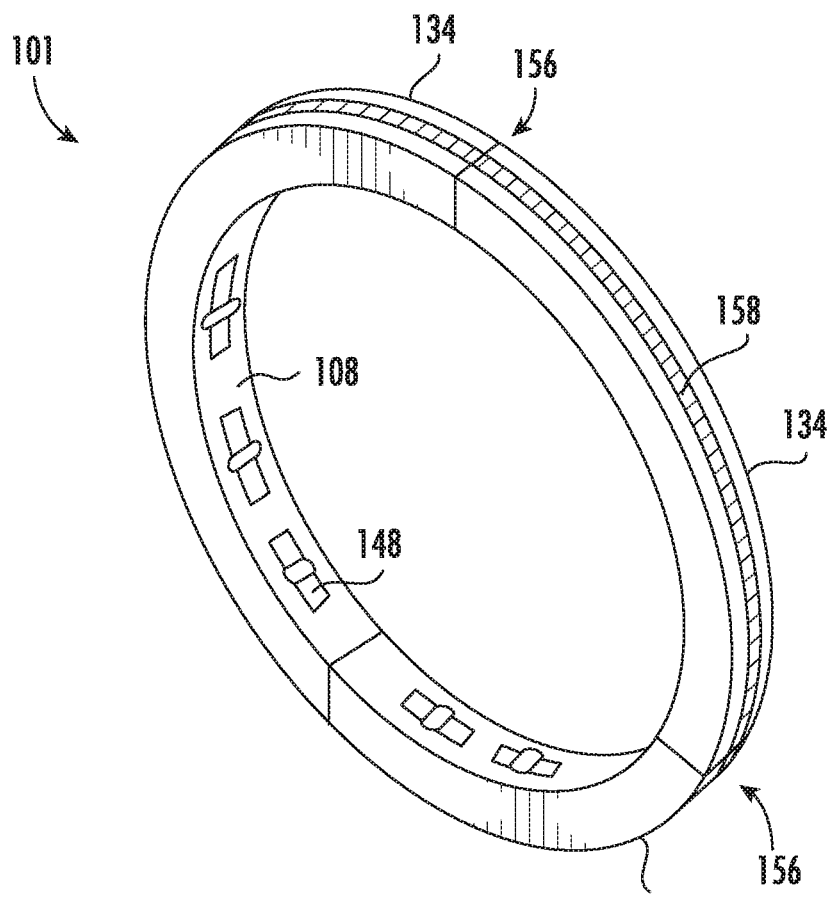
FIG. 14 illustrates another embodiment of the non-contacting carbon seal according to aspects of the present disclosure, particularly illustrating an embodiment where the non-contacting carbon seal is an archbound seal.
Figures 15, 16:
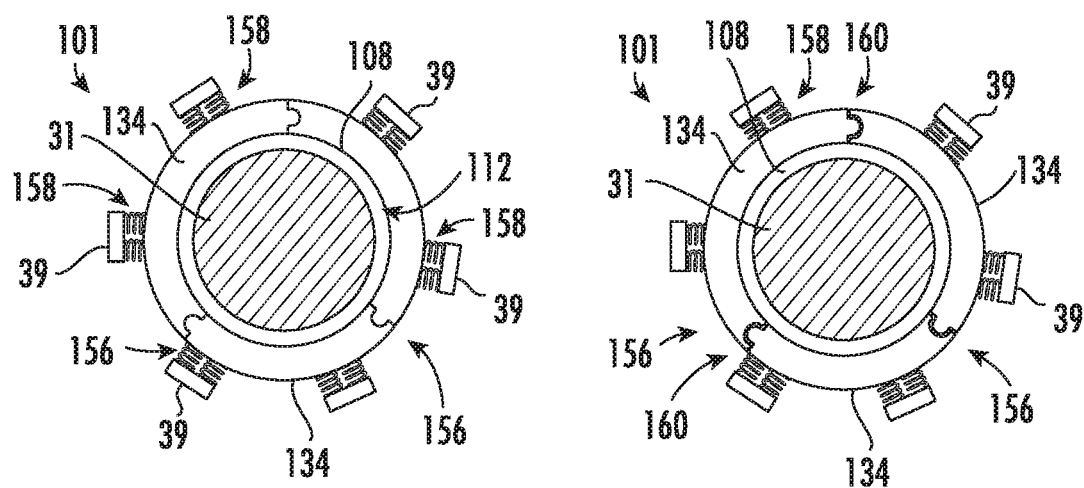
FIG. 15 illustrates another embodiment of the archbound seal according to aspects of the present disclosure, particularly illustrating an archbound seal with a minimum circumference.
FIG. 16 illustrates the archbound seal of FIG. 15 with a larger circumference.

Referring now to FIG. 14, another embodiment of the non-contacting carbon seal 101 is illustrated according to aspects of the present disclosure. Particularly, FIG. 15 illustrates a non-contacting carbon seal 101 where the non-contacting carbon seal 101 is an archbound seal. It should be recognized that the archbound seal may be utilized in the seal assembly 100 as described generally in regards to FIG. 2 or any other capable system. Further, the archbound seal may be coupled to the fixed housing 39 as generally described in regards to FIGS. 6 and 7. For example, the archbound seal may be recessed in the slot 122 and may be in sealing engagement with the rotating shaft 31 and/or the rotating surface 121.

The archbound seal may include a plurality of segments 134 that together form the archbound seal. For example, the segments 134 may be sections of the circumference of the archbound seal. Further, the segments 134 may join together at one or more joints 156 positioned between the segments 134. Each segment 134 may generally include any of the hydrodynamic grooves 126 positioned on each segment's inner sealing surface 108 as described in regards to FIGS. 8-13. In other embodiments, such as the embodiment depicted in FIG. 14, each segment 134 may include one or more hydrodynamic pads 148 positioned on each segment's 134 inner sealing surface 108. Similar to the hydrodynamic grooves 126, the hydrodynamic pads 148 may compress the air around the seal to form the air film and thus the radial gap 112. The non-contacting carbon seal 101 formed from the segments 134 may have a variable circumference. For example, the force of the air film formed from the hydrodynamic grooves 126 and/or hydrodynamic pads 148 may alter the circumference of the archbound seal reducing or increasing a clearance of the joint(s) 156. It should be recognized that the joints 156 between segments 134 may have any configuration that joins the segments 134 while allowing the circumference of the archbound seal to change. In one embodiment, the archbound seal may include only one segment 134 and one joint 156 between a first end and a second end of the one segment 134. Such an embodiment may allow for variance in the circumference of the archbound seal while still maintaining the simplicity of one seal component.

The archbound seal may include a radial gap adjuster 158 coupled to at least one of the segments 134. The radial gap adjuster 158 generally applies a force to one or more of the segments 134 in order to create a smaller or larger radial gap 112. In the illustrated embodiment, the archbound seal includes a slot with the radial gap adjuster 158 housed in the slot. In the illustrated embodiment, the radial gap adjuster 158 may be a spring in compression to force the segments 134 together and reduce the circumference of the archbound seal and thus the radial gap 112. For example, the radial gap adjuster 158 may apply a circumferential force along the circumference of the archbound seal.

Referring now to FIGS. 15 and 16, two views of one embodiment of the archbound seal are illustrated according to aspects of the present disclosure. Particularly, FIG. 15 illustrates an archbound seal with a minimum circumference; while, FIG. 16 illustrates the archbound seal with a larger circumference. It should be recognized that the archbound seal of FIGS. 15 and 16 may be configured generally as the archbound seal of FIG. 14. For example, the archbound seal may include the segments 134, the hydrodynamic grooves 126 and/or the hydrodynamic pads 148, and the radial gap adjuster 158.

As illustrated in FIGS. 15 and 16, a further embodiment of the radial gap adjuster 158 is illustrated according to aspects of the present disclosure. In the depicted embodiment, the radial gap adjuster 158 may include one or more springs coupled between the segment(s) 134 and the fixed housing 39. Further, two or more radial gap adjusters 158 may be coupled to each segment 134. In the depicted embodiment, springs of the radial gap adjuster(s) 158 are in compression between the fixed housing 39 and the archbound seal. As such, the force of the springs may apply a radially inward force on each segment 134. The radially inward force may reduce the radial gap 112 and thus reduce the circumference of the archbound seal. For example, the radially inward force may reduce the size of a circumferential gap 160 positioned between each segment 134 at each joint 156.

Referring particularly to FIG. 15, the archbound seal is illustrated where the radial gap adjuster(s) 158 has reduced the circumference of the archbound seal to a minimum value. Further, the circumferential gap 160 may be at a minimum value or the segments 134 may be in full contact at the joint(s) 134. For example, the turbomachine 10 may be off or at a startup condition where the rotating shaft 31 is stationary or rotating at a relatively low RPM. As such, the hydrodynamic grooves 126 and/or the hydrodynamic pads 148 may create a reduced lifting force and/or air film acting on the inner sealing surface 108 of each segment 134 and the rotating shaft 31. For example, the radially inward and/or circumferential force may be approximately the same or greater than a radially outer force (e.g., the force normal to the lifting force acting on the rotating shaft 31) exerted by the air film acting on the area of the inner sealing surface 108.

Referring particularly to FIG. 16, the archbound seal is illustrated where the circumference of the archbound seal is greater than in FIG. 15. For example, a greater radially outer force applied by the air film on the inner sealing surface(s) 108 may push the segments 134 outward in the radial direction, thus increasing the circumference of the archbound seal. For example, circumferential gap 160 may increase and thus also increase the circumference of the archbound seal. The air film may apply a greater radially outer force due to a combination of the rotating shaft 31 spinning at increased speeds (e.g., a cruise or take-off condition) and/or an increase in the size of the rotating shaft 31 due to thermal expansion. It should be recognized that a faster spinning rotating shaft 31 may pull more air into the hydrodynamic grooves and/or pads 126, 148. The increased air supply can lead to more compression and therefore a stiffer air film.

Generally, the circumference of the archbound seal may increase until the radially inward and/or circumferential force applied by the springs of the radial gap adjuster 158 reach an equilibrium position with any outward radial force applied by the air film. Further, it should be recognized that the joint(s) 156 may include additional seals and architecture to prevent leaks of the air in the pressurized compartment 124 as the circumferential gap(s) 160 increase in size. For instance, in the depicted embodiment, the joint(s) 156 may include a dovetail configuration that allows the size of the radial gap 112 to fluctuate from a minimum value to a maximum value. In certain embodiments, the radially gap 112 may remain generally constant throughout various operating conditions. In other embodiments, the radial gap 112 may increase or decrease as the speed of the rotating shaft 31 increases and the size of the rotating shaft 31 increases due to thermal expansion. For instance, in one embodiment, the radial gap 112 may be at a minimum value when the turbomachine 10 is at the cruise condition, leading to further efficiencies.

Figure 17:
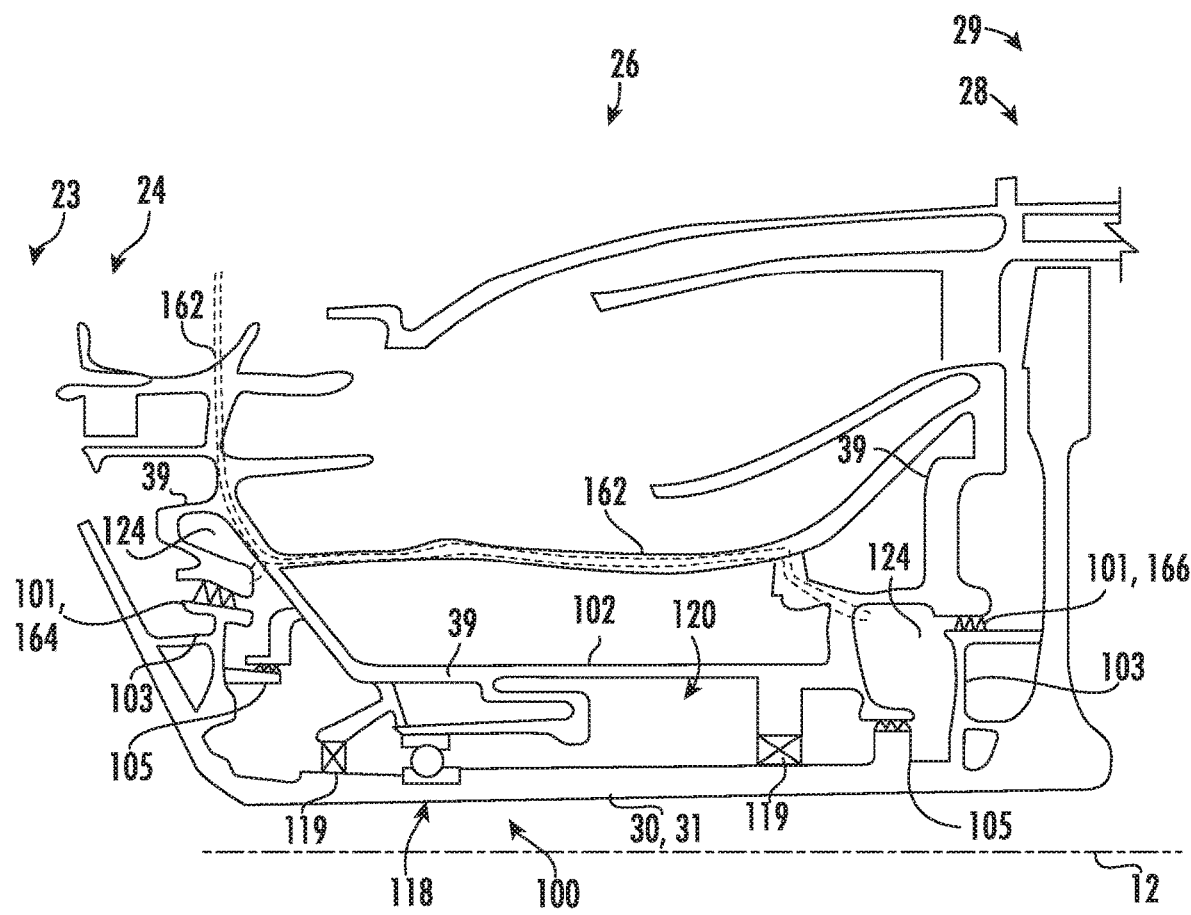
FIG. 17 illustrates another embodiment of the seal assembly according to aspects of the present disclosure, particularly illustrating the seal assembly where the pressurized compartment is fluidly coupled to a compressor bleed conduit.

Referring now to FIG. 17, another embodiment of the seal assembly 100 is illustrated according to aspects of the present disclosure. FIG. 17 particularly illustrates the seal assembly 100 where the pressurized compartment 124 is fluidly coupled to a compressor bleed conduit 162. The seal assembly 100 of FIG. 17 may generally be configured as the seal assembly 100 of FIG. 2. For example, the seal assembly 100 may include the rotating shaft 31 (such as the high pressure drive shaft 30), the sump housing 102, the bearing 118, the sump seal(s) 105, the pressurized housing 103, and the non-contacting carbon seal 101. As shown, the seal assembly 100 may include one more additional bearings 119 positioned in the sump housing 102. For example, the additional bearings 119 may be radial bearings and/or thrust bearings.

However, the embodiment of FIG. 17 may include the compressor bleed conduit 162 fluidly coupling the compressor section 23 to the pressurized compartment 124. In general, the compressor bleed conduit 162 may be used to bleed air from the compressor section 23 and pressurize the pressurized compartment 124. It should be recognized that by pressurizing the pressurized compartment 124 to a higher pressure than the bearing compartment 120, the amount of the cooling lubricant that leaks through the sump seal(s) 105 may be minimized. Further, as shown, the compressor bleed conduit 162 may be fluidly coupled to portions of the pressurized compartment 124 both forward and aft of the bearing compartment 120. The compressor bleed conduit 162 may be a separate component, or, in certain embodiments, at least a portion of the compressor bleed conduit 162 may be formed integrally with the fixed housing 39.

In one embodiment, the compressor bleed conduit 162 may fluidly couple the pressurized compartment 124 to the high pressure compressor 24 (see, e.g., FIGS. 1 and 2). For example, a bleed port may be positioned in the high pressure compressor 24 to fluidly couple the compressor bleed conduit 162 to the airflow 58 passing through the high pressure compressor 24. In another embodiment, the compressor bleed conduit 162 may fluidly couple the pressurized compartment 124 to the booster compressor 22 (see, e.g., FIG. 1). For instance, a bleed port may be positioned in the booster compressor 22 to fluidly couple the compressor bleed conduit 162 to the airflow 56 passing through the booster compressor 22. Still, in other embodiments, it should be recognized that one or more conduits may fluidly couple the pressurized compartment 124 to various positions along the core engine 14 and/or the by-pass airflow conduit 48.

Still referring to FIG. 17, the seal assembly 100 is illustrated with two non-contacting carbon seals 101. It should be recognized that the non-contacting carbon seal(s) 101 may generally be any of the non-contacting carbon seals 101 as described in regards to FIGS. 5-16. Further, one of the non-contacting carbon seals 101 may be one type of seal, such as the hydrodynamic seal of FIGS. 8-14, while a second non-contacting carbon seal 101 may be another type of seal, such as the archbound seal of FIGS. 15-17. As illustrated, a first non-contacting carbon seal 164 may be positioned forward of the sump housing 102 to at least partially define a portion of the pressurized compartment 124 forward of the sump housing 102. Similarly, a second non-contacting carbon seal 166 may be positioned aft of the sump housing 102 to at least partially define a portion of the pressurized compartment 124 aft of the sump housing 102. As such, the portions of the pressurized compartment 124 may fully or partially enclose the sump housing 102 such that the cooling lubricant that leaks from the bearing compartment 120 is reduced due to the pressure differential with the pressurized compartment 124.

This written description uses exemplary embodiments to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A seal assembly for a turbomachine, the turbomachine including a rotating shaft extending along a centerline and a fixed housing positioned exterior to the rotating shaft in a radial direction relative to the centerline, the seal assembly comprising:

a sump housing including at least a portion of the rotating shaft and the fixed housing, wherein the sump housing at least partially defines a bearing compartment for holding a cooling lubricant therein;

a bearing in contact with an exterior surface of the rotating shaft and an interior surface of the fixed housing and positioned within the sump housing, wherein the bearing supports the rotating shaft;

a sump seal positioned between the rotating shaft and the fixed housing and at least partially defining the bearing compartment for holding the cooling lubricant;

a pressurized housing positioned exterior to the sump housing and including at least a portion of the rotating shaft and the fixed housing, wherein the pressurized housing defines a pressurized compartment to at least partially enclose the sump housing;

a non-contacting carbon archbound air seal positioned between the rotating shaft and the fixed housing and at least partially defining the pressurized compartment to enclose the sump housing, wherein the non-contacting carbon archbound air seal comprises a plurality of segments, wherein each segment of the plurality of segments comprises one or more hydrodynamic grooves or hydrodynamic pads, a first end having a projection and a second end having a groove, wherein the projection of each segment of the plurality of segments is configured to mate with the groove of an adjacent segment of the plurality of segments to form a plurality of expandable joints between the plurality of segments, wherein the expandable joints are configured to move radially between a fully-compressed configuration and an expanded configuration, wherein in the fully-compressed configuration, the plurality of segments are prevented from further radial compression and the inner diameter of the plurality of segments has a first diameter which is sized such that there is a radial gap between the plurality of segments and the rotating shaft, and wherein in the expanded configuration, the plurality of segments are spaced apart from each other at the expandable joints and the inner diameter of the plurality of segments has a second diameter which is larger than the first diameter; and one or more springs disposed between each segment of the non-contacting carbon archbound seal and the fixed housing, and wherein the one or more springs are simultaneously in contact with the fixed housing and one segment of the non-contacting carbon archbound seal.

2. The seal assembly of claim 1, wherein the sump seal is a first sump seal and wherein the seal assembly further comprises:
   a second sump seal positioned between the rotating shaft and the fixed housing and at least partially defining the bearing compartment for holding the cooling lubricant.

3. The seal assembly of claim 1, wherein the non-contacting carbon archbound air seal is a first non-contacting carbon seal and wherein the seal assembly further comprises:
   a second non-contacting carbon seal positioned between the rotating shaft and the fixed housing and at least partially defining the pressurized compartment to enclose the sump housing.

4. The seal assembly of claim 1, wherein the sump seal is a carbon seal.

5. The seal assembly of claim 1, wherein the sump seal is a labyrinth seal.

6. The seal assembly of claim 1, wherein the sump seal is a brush seal.

7. The seal assembly of claim 1, wherein the sump seal is a hydrodynamic seal.

8. The seal assembly of claim 1, wherein the bearing is a thrust bearing, and wherein the thrust bearing supports the rotating shaft from loads in an axial direction relative to the centerline.

9. The seal assembly of claim 1, wherein the bearing is a radial bearing, and wherein the radial bearing supports the rotating shaft from loads in the radial direction relative to the centerline.

10. A turbomachine defining a centerline extending along a length of the turbomachine, wherein the turbomachine comprises:
    a compressor;
    a turbine;
    a rotating shaft extending along the centerline and coupling the compressor and the turbine;
    a fixed housing extending along the centerline and positioned exterior to the rotating shaft in a radial direction relative to the centerline; and
    a seal assembly comprising:
    a sump housing including at least a portion of the rotating shaft and the fixed housing, wherein the sump housing at least partially defines a bearing compartment for holding a cooling lubricant therein;
    a bearing in contact with an exterior surface of the rotating shaft and an interior surface of the fixed housing and positioned within the sump housing, wherein the bearing supports the rotating shaft;
    a sump seal positioned between the rotating shaft and the fixed housing and at least partially defining the bearing compartment for holding the cooling lubricant;
    a pressurized housing positioned exterior to the sump housing and including at least a portion of the rotating shaft and the fixed housing, wherein the pressurized housing defines a pressurized compartment to at least partially enclose the sump housing; and
    a non-contacting carbon archbound air seal positioned between the rotating shaft and the fixed housing and at least partially defining the pressurized compartment to enclose the sump housing, wherein the non-contacting carbon archbound air seal comprises a plurality of segments, each segment having one or more hydrodynamic grooves or hydrodynamic pads, a first end with a projection, and a second end with a notch, wherein the projection of each segment is configured to mate with a respective notch of an adjacent segment thereby forming a plurality of joints between the plurality of segments, wherein the joints are configured to move radially between a fully-compressed configuration and one or more expanded configurations which are larger than the fully-compressed configuration, and wherein in the fully-compressed configuration, the plurality of segments comprise a minimum diameter sized such that there is a radial gap between the plurality of segments and the rotating shaft; and
    one or more springs disposed between each segment of the non-contacting carbon archbound seal and the fixed housing, and wherein the one or more springs are simultaneously in contact with the fixed housing and one segment of the non-contacting carbon archbound seal.

11. The turbomachine of claim 10, wherein the turbomachine further comprises:
    a compressor bleed conduit fluidly coupling the compressor to the pressurized compartment.

12. The turbomachine of claim 11, wherein the compressor includes a high pressure compressor and a booster compressor, and wherein the compressor bleed conduit fluidly couples the pressurized compartment to the booster compressor.

13. The turbomachine of claim 11, wherein the compressor includes a high pressure compressor and a booster compressor, and wherein the compressor bleed conduit fluidly couples the pressurized compartment to the high pressure compressor.

14. The turbomachine of claim 10, wherein the sump seal is a first sump seal, the non-contacting carbon archbound air seal is a first non-contacting carbon seal, and wherein the seal assembly further comprises:
    a second sump seal positioned between the rotating shaft and the fixed housing and at least partially defining the bearing compartment for holding the cooling lubricant; and
    a second non-contacting carbon seal positioned between the rotating shaft and the fixed housing and at least partially defining the pressurized compartment to enclose the sump housing.

15. A seal assembly for a turbomachine, the turbomachine including a rotating shaft extending along a centerline and a fixed housing positioned exterior to the rotating shaft in a radial direction relative to the centerline, the seal assembly comprising:
    a sump housing including at least a portion of the rotating shaft and the fixed housing, wherein the sump housing at least partially defines a bearing compartment for holding a cooling lubricant therein;
    a bearing in contact with an exterior surface of the rotating shaft and an interior surface of the fixed housing and positioned within the sump housing, wherein the bearing supports the rotating shaft;
    a sump seal positioned between a first portion of the rotating shaft and the fixed housing and at least partially defining the bearing compartment for holding the cooling lubricant;
    a pressurized housing positioned exterior to the sump housing and including at least a portion of the rotating shaft and the fixed housing, wherein the pressurized housing defines a pressurized compartment to at least partially enclose the sump housing; and a non-contacting carbon archbound air seal positioned between a second portion of the rotating shaft and the fixed housing and at least partially defining the pressurized compartment to enclose the sump housing, wherein the non-contacting carbon archbound air seal is spaced apart radially from the sump seal, wherein the second portion of the rotating shaft is spaced apart radially from the first portion of the rotating shaft, wherein the non-contacting carbon archbound air seal comprises a plurality of segments, wherein each segment comprises one or more hydrodynamic grooves or hydrodynamic pads, wherein the non-contacting carbon archbound air seal has an inner diameter variable between a minimum inner diameter and a maximum inner diameter, wherein a radial gap exists between the non-contacting carbon archbound air seal and the rotating shaft when the non-contacting carbon archbound air seal has the minimum inner diameter; and one or more springs extending radially from each segment of the non-contacting carbon archbound seal to the fixed housing.

16. The seal assembly of claim 15, wherein the segments of the non-contacting carbon archbound air seal are coupled together at joints comprising a dovetail configuration.

17. The seal assembly of claim 15, wherein the one or more springs are configured such that the radial gap remains constant throughout various operating conditions.

18. The seal assembly of claim 15, wherein the one or more springs are configured such that the radial gap is at a first value at a first operating condition and at a second value at a second operating condition, the second value being different than the first value, and the second operating condition being different than the first operating condition.

19. The seal assembly of claim 18, wherein the first value is a minimum value and corresponds to a cruise operating condition.

20. The seal assembly of claim 15, further comprising two or more springs disposed between the fixed housing and each segment of the non-contacting carbon archbound air seal.

* * * * *